(12) United States Patent
Broas et al.

(10) Patent No.: US 10,990,374 B2
(45) Date of Patent: Apr. 27, 2021

(54) VIRTUAL MACHINE UPDATE WHILE KEEPING DEVICES ATTACHED TO THE VIRTUAL MACHINE

(71) Applicant: MICROSOFT TECHNOLOGY LICENSING, LLC, Redmond, WA (US)

(72) Inventors: Kevin Michael Broas, Kirkland, WA (US); David Alan Hepkin, Redmond, WA (US); Wen Jia Liu, Seattle, WA (US); Hadden Mark Hoppert, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 206 days.

(21) Appl. No.: 16/132,151

(22) Filed: Sep. 14, 2018

(65) Prior Publication Data
US 2020/0089484 A1 Mar. 19, 2020

(51) Int. Cl.
*G06F 8/65* (2018.01)
*G06F 9/4401* (2018.01)
*G06F 9/455* (2018.01)

(52) U.S. Cl.
CPC .............. *G06F 8/65* (2013.01); *G06F 9/4418* (2013.01); *G06F 9/45558* (2013.01); *G06F 2009/45562* (2013.01); *G06F 2009/45575* (2013.01)

(58) Field of Classification Search
CPC ...... G06F 9/45558; G06F 8/65; G06F 9/4418; G06F 2009/45562; G06F 2009/45575
See application file for complete search history.

(56) References Cited

U.S. PATENT DOCUMENTS

| 9,292,332 B1* | 3/2016 | Liguori | G06F 9/45558 |
| 2011/0066786 A1* | 3/2011 | Colbert | G06F 9/45558 711/6 |

(Continued)

OTHER PUBLICATIONS

Hong, et al., "GPU Virtualization and Scheduling Methods: A Comprehensive Survey", In Journal of ACM Computing Surveys, vol. 50, Issue 3, Jun. 29, 2017, 37 Pages.

(Continued)

*Primary Examiner* — S. Sough
*Assistant Examiner* — Cheneca Smith
(74) *Attorney, Agent, or Firm* — Workman Nydegger

(57) ABSTRACT

An operation of a VM running first and second VM components is suspended so that a servicing operation for the VM can be performed. The VM has devices directly attached to it. A state of the first VM components is saved. An identification pointer for the second VM components is saved in a portion of the computing system physical memory without removing any underlying data structures of second VM components from computing system physical hardware. The directly attached devices remain configured as attached to the VM and remain configured to communicate with the VM while the VM is suspended and while the servicing operation is performed. The first VM components are shut down and then restored at the completion of the servicing operation using the saved state. The restored first VM components are reconnected to the second VM components using the identification pointers. The operation of the VM is restored.

19 Claims, 6 Drawing Sheets

(56) References Cited

U.S. PATENT DOCUMENTS

2012/0005676 A1* 1/2012 Nakajima ........... G06F 9/45558
718/1
2014/0157264 A1 6/2014 Russinovich et al.
2018/0011797 A1 1/2018 Shi et al.

OTHER PUBLICATIONS

Kashyap, et al., "Instant OS Updates via Userspace Checkpoint-and-Restart", In Proceedings of the Usenix Conference on Usenix Annual Technical Conference, Jun. 22, 2016, pp. 605-619.
"International Search Report and Written Opinion Issued in PCT Application No. PCT/US19/038837", dated Sep. 27, 2019, 14 Pages. (MS# 404931-WO-PCT).

* cited by examiner

VIRTUAL MACHINE UPDATE WHILE KEEPING DEVICES ATTACHED TO THE VIRTUAL MACHINE

BACKGROUND

The updating of host operating systems traditionally requires a reboot and therefore workload downtime. For virtualization hosts running virtual machine (VM) instances, downtime also implies downtime of the workloads in hosted virtual machines. Virtualization technology often allows running VM contexts to be preserved by pausing execution of VMs and writing their associated RAM contexts to disk. However, such operations are typically relatively slow and result in detectable outages, especially where the storage subsystem is slow or the amount of memory to be preserved and therefore the amount of IO required would be very large.

In some update operations, rather than writing VM memory contents to disk, the host memory pages used for VM memory are catalogued such that the virtualization software can reassemble the state of VMs across the update operation. During the update operation, the current operating system catalogues the VM artifacts, tears down the VM, prepares the new software for execution, unloads the current software, and loads the updated software which reads the meta-data and reconstructs the VMs using the same memory pages as previously used. While this can be faster than writing memory contents to disk, the duration of the operation and therefore the window of downtime is still negatively affected by several factors, including: 1) the quantity and continuity of memory to be preserved 2) the destruction (including un-mapping) and re-construction (including re-mapping) of VM artifacts, especially the guest to host page mappings. In addition, VM instances which have assigned devices cannot participate in the update operation because assigned device cannot be paused or quiesced across the operation nor can their state be saved and restored.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

At least one embodiment disclosed herein is related to computing systems and methods for performing a servicing operation on a virtual machine (VM). A computing system has first virtual machine components and second VM components that remain loaded in computing system physical hardware during the servicing operation. An operation of a VM running the first and second VM components is suspended so that the servicing operation for the VM can be performed. The VM has devices that are directly attached to it. A state of the first VM components is saved. An identification pointer for the second VM components is saved in a portion of the computing system physical memory without removing any underlying data structures of the second VM components from the computing system physical hardware. The directly attached devices remain configured as attached to the VM and configured to be in communication with the VM while the VM is suspended and while the servicing operation is performed. The first VM components are shut down and then restored at the completion of the servicing operation using the saved state. The restored first VM components are reconnected to the second VM components using the identification pointers. The operation of the VM is restored.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
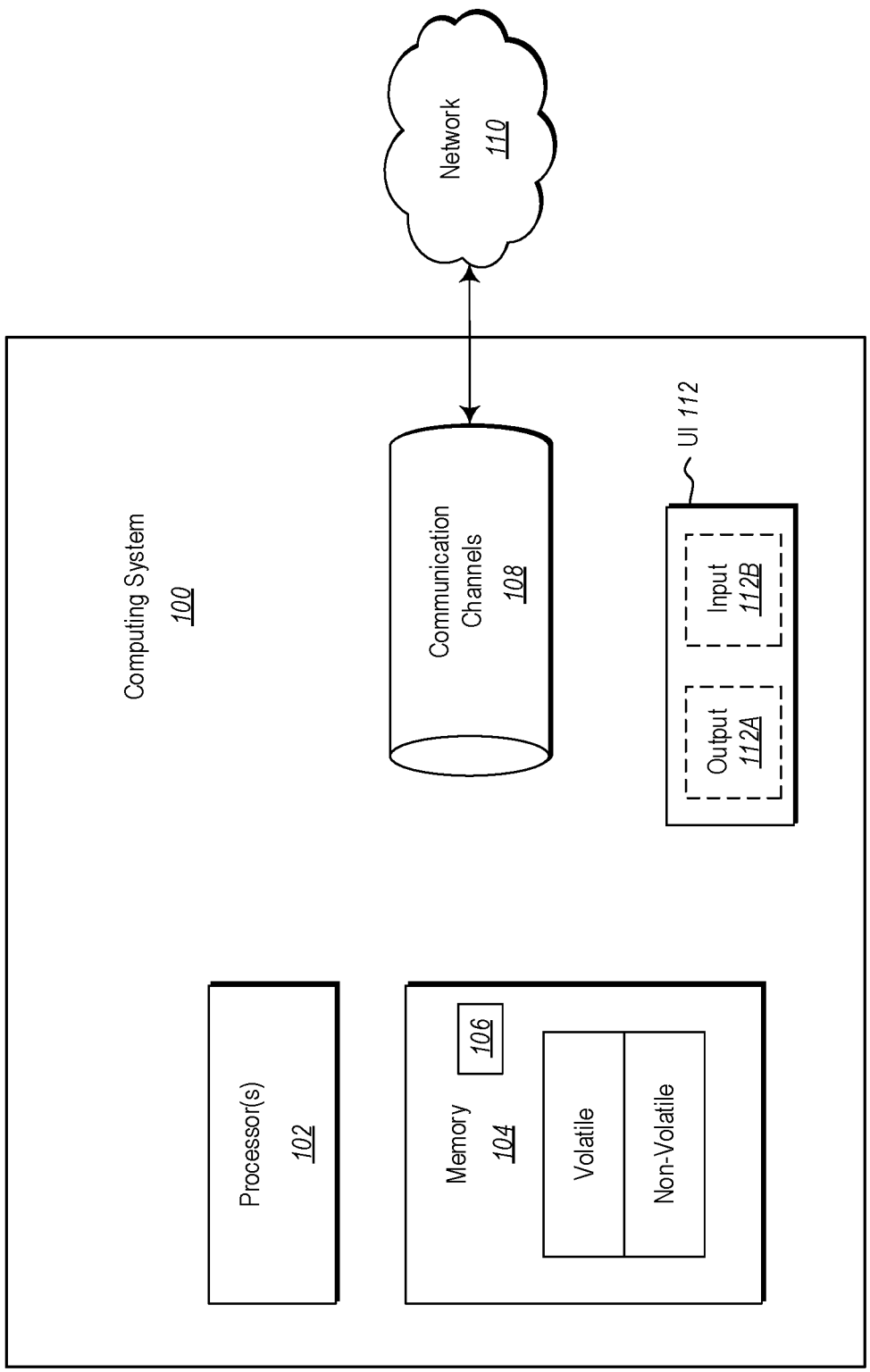
FIG. 1 illustrates an example computing system in which the principles described herein may be employed.

The updating of host operating systems traditionally requires a reboot and therefore workload downtime. For virtualization hosts running virtual machine (VM) instances, downtime also implies downtime of the workloads in hosted virtual machines. Virtualization technology often allows running VM contexts to be preserved by pausing execution of VMs and writing their associated RAM contexts to disk. However, such operations are typically relatively slow and result in detectable outages, especially where the storage subsystem is slow or the amount of memory to be preserved and therefore the amount of IO required would be very large.

In some update operations, rather than writing VM memory contents to disk, the host memory pages used for VM memory are catalogued such that the virtualization software can reassemble the state of VMs across the update operation. During the update operation, the current operating system catalogues the VM artifacts, tears down the VM, prepares the new software for execution, unloads the current software, and loads the updated software which reads the meta-data and reconstructs the VMs using the same memory pages as previously used. While this can be faster than writing memory contents to disk, the duration of the operation and therefore the window of downtime is still negatively affected by several factors, including: 1) the quantity and continuity of memory to be preserved 2) the destruction (including un-mapping) and re-construction (including re-mapping) of VM artifacts, especially the guest to host page mappings. In addition, VM instances which have assigned devices cannot participate in the update operation because assigned device cannot be paused or quiesced across the operation nor can their state be saved and restored.

The embodiments disclosed herein provide improvements for updating computing system running VMs over previous update methods.

At least one embodiment disclosed herein is related to computing systems and methods for performing a servicing operation on a virtual machine (VM). A computing system has first virtual machine components and second VM components that remain loaded in computing system physical hardware during the servicing operation. An operation of a VM running the first and second VM components is suspended so that the servicing operation for the VM can be performed. The VM has devices that are directly attached to it. A state of the first VM components is saved. An identification pointer for the second VM components is saved in a portion of the computing system physical memory without removing any underlying data structures of the second VM components from the computing system physical hardware. The directly attached devices remain configured as attached to the VM and configured to re in communication with the VM while the VM is suspended and while the servicing operation is performed. The first VM components are shut down and then restored at the completion of the servicing operation using the saved state. The restored first VM components are reconnected to the second VM components using the identification pointers. The operation of the VM is restored.

There are various technical effects and benefits that can be achieved by implementing aspects of the disclosed embodiments. By way of example, at least some of the embodiments the operation is not affected by the quantity and continuity of the guest to host memory mappings as will be explained in more detail to follow. This is advantageously an improvement on current methods where the memory stack must be walked to determine guest to host mappings. As will be appreciated, it may be timely and take computing system resources to walk the memory stack when there is a large number of discontinuous memory page mappings.

It is additionally an improvement on traditional methods as in the disclosed embodiments some of the VM components have their underlying data structures remain loaded in the computing system physical resources such as memory and processing resources. This saves on time as these components do not have to be rebuilt. In traditional methods, these components are destroyed and rebuilt, thus taking more time.

Further, the embodiments disclosed herein provide the technical improvement of allowing devices to remain directly attached to a VM during an update process. This ability is not present in traditional update methods.

Further, the technical effects related to the disclosed embodiments can also include reduced power consumption, and can also include efficiency gains, as the quicker time will require less processing resources, which can in turn be used by other process of the computing system.

Some introductory discussion of a computing system will be described with respect to FIG. 1. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein may also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
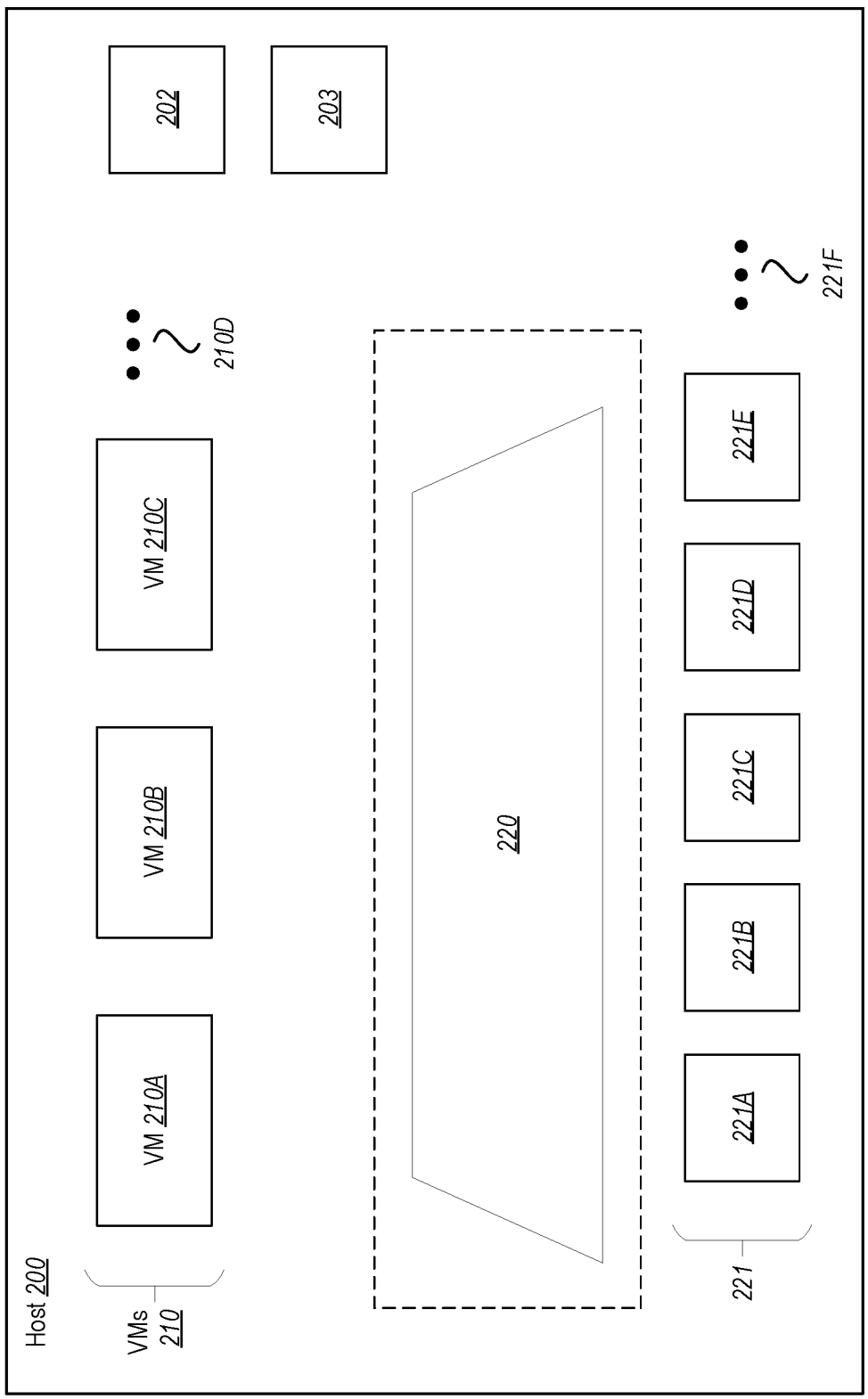
FIG. 2 illustrates an example host computing system for a Virtual Machine (VM)

In embodiments, the computing system 100 may be implemented as a host computing system that is capable of running one or more, and potentially many, virtual machines (VM). For instance, FIG. 2 abstractly illustrates a host 200 in further detail. In the case of FIG. 2, the host 200 is illustrated as operating three virtual machines 210 including virtual machines 210A, 210B and 210C. However, the ellipses 210D once again represents that the principles described herein are not limited to the number of virtual machines running on the host 200. There may be as few as zero virtual machines running on the host with the only upper limit being defined by the physical capabilities of the host 200.

During operation, the virtual machines emulate a fully operational computing system including an at least an operating system, and perhaps one or more other applications as well. Each virtual machine is assigned to a particular client computer, and is responsible to support the desktop environment for that client. As the user interacts with the desktop at the client, the user inputs are transmitted from the client to the virtual machine. The virtual machine processes the user inputs and, if appropriate, changes the desktop state. If such change in desktop state is to cause a change in the rendered desktop, then the virtual machine alters the image or rendering instructions, if appropriate, and transmits the altered image or rendered instructions to the client computing system for appropriate rendering. From the prospective of the user, it is as though the client computing system is itself performing the desktop processing.

The host 200 includes a hypervisor 220 that emulates virtual resources for the virtual machines 210 using physical resources 221 that are abstracted from view of the virtual machines 210. The hypervisor 221 also provides proper isolation between the virtual machines 210. Thus, from the perspective of any given virtual machine, the hypervisor 220 provides the illusion that the virtual machine is interfacing with a physical resource, even though the virtual machine only interfaces with the appearance (e.g., a virtual resource) of a physical resource, and not with a physical resource directly. In FIG. 2, the physical resources 221 are abstractly represented as including resources 221A through 221F. Examples of physical resources 221 include processing capacity, memory, disk space, network bandwidth, media drives, and so forth. The host 200 may operate a host agent 202 that monitors the performance of the host, and performs other operations that manage the host. Furthermore, the host 200 may include other components 203.

Figure 3A:
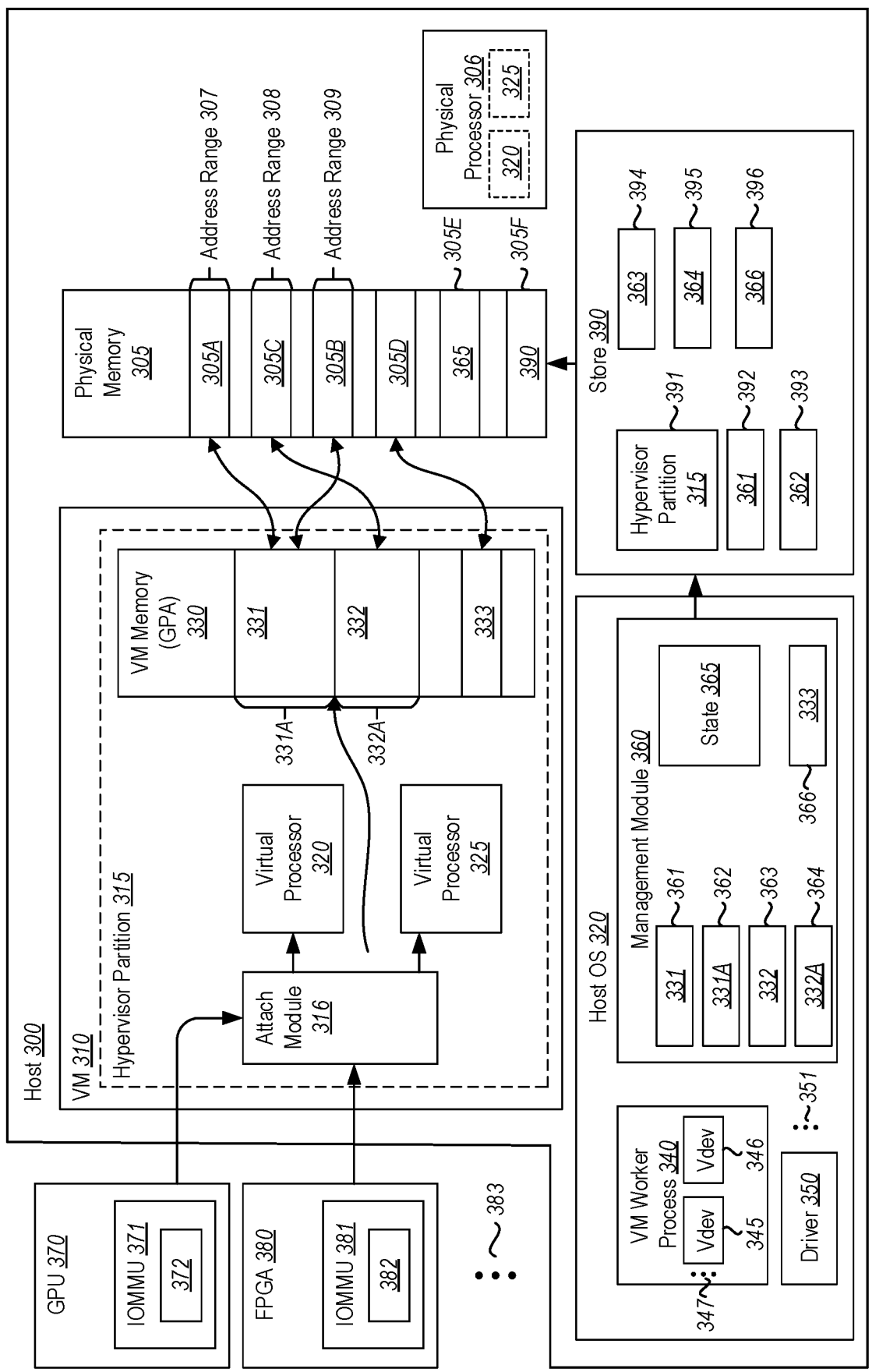
FIGS. 3A-3C illustrate an example VM and environment for performing a servicing operation on the VM.
Figure 3B:
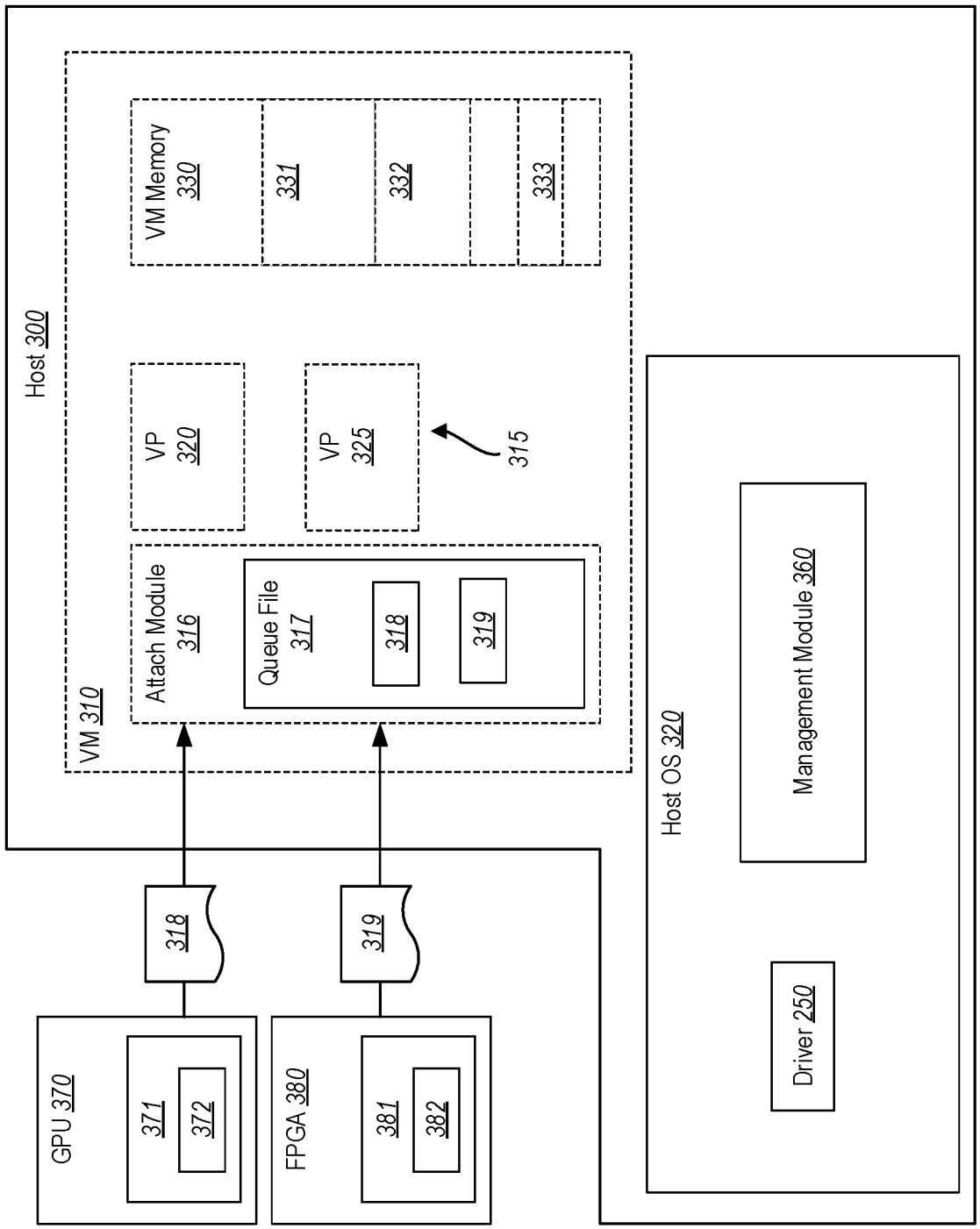
Figure 3C:
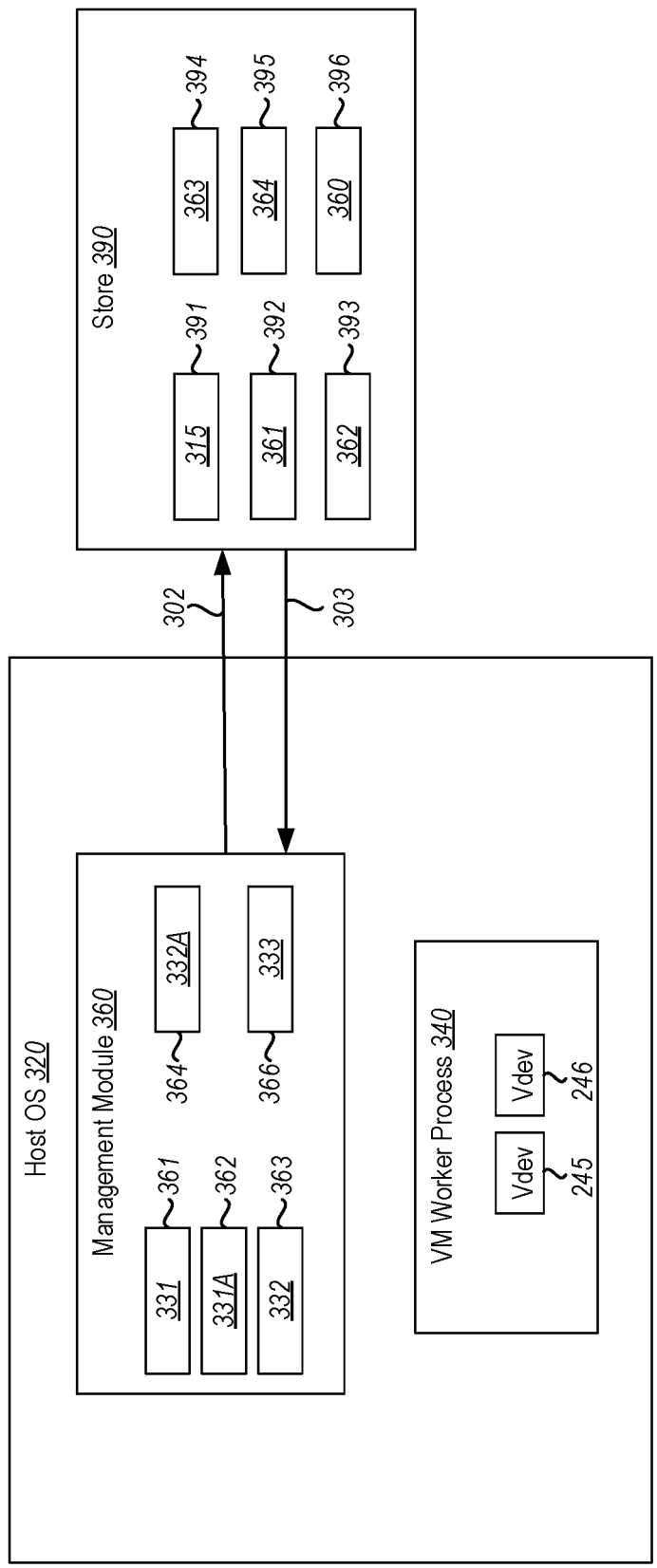

Attention is now given to FIGS. 3A-3C, which illustrate an embodiment of a host 300, which may correspond to the host 200 previously described. The host 300 may include various components or functional blocks that may implement the various embodiments disclosed herein as will be explained. The various components or functional blocks of host 300 may be implemented on a local computing system or may be implemented on a distributed computing system that includes elements resident in the cloud or that implement aspects of cloud computing. The various components or functional blocks of the host 300 may be implemented as software, hardware, or a combination of software and hardware. The host 300 may include more or less than the components illustrated in FIGS. 3A-3C, and some of the components may be combined as circumstances warrant.

As illustrated, the host 300 may include or otherwise have access to physical memory 305, which may correspond to memory 104 or one of the physical resources 221 previously described. In the embodiments, the physical memory 305 represents the physical memory resources, both volatile and non-volatile, of the host 300 that may be utilized by one or more virtual machines as will be explained in more detail to follow. Accordingly, any reference to computing system physical memory in this disclosure or in the claims may refer to volatile RAM memory, persistent RAM memory, disk memory, storage memory, or any type of volatile and non-volatile memory source. Thus, the embodiments and claims disclosed herein are not limited by the particular type of computing system physical memory that is implemented when practicing the embodiments disclosed herein.

The host 300 may also include or otherwise have access to a physical processor 306, which may correspond to the physical processor 102 or one of the physical resources 221 previously described. In the embodiments, the physical processor 306 represents the physical processing resources of the host 300 that may be utilized by one or more virtual machines as will be explained in more detail to follow.

As illustrated, the host 300 may operate a virtual machine (VM) 310 instance that may correspond to the one of the VMs 210 previously described. Although only one VM is shown as being operated by the host 300, this is for ease of explanation only and accordingly the embodiments disclosed herein contemplate that the host 300 may operate any number of additional VMs as circumstances warrant. The host 300 may also include a host operating system (OS) 320 that may be able to control the operation and function of the VM 310. The VM 310 and host OS 320 will be explained in further detail to follow.

As mentioned previously in relation to FIG. 2, the host may include a hypervisor such as the hypervisor 220. Accordingly, the embodiments disclosed herein contemplate a hypervisor associated with the host 300 and the VM 310. However, for ease of explanation, FIG. 3A does not show a hypervisor. Rather, FIG. 3A shows a hypervisor partition 315 that is generated by the hypervisor for the VM 310. As illustrated, the hypervisor partition 315 includes a first virtual processor 320 and second virtual processor 325. It will be noted that the hypervisor partition 315 may include additional virtual processors as circumstances warrant. The virtual processors 220 and 225 are seen by the VM 310 as being actual processors. However, as illustrated by the dotted lines in the physical processor 306, the virtual processors use the hypervisor to access the processing resources of the physical processor 306.

The hypervisor partition 315 also includes VM memory 330 with corresponding Guest Page Address (GPA) space that is used to map portions of the physical memory 305 to VM memory 330. For example, as illustrated in FIG. 3A a portion of physical memory 305A having an address range 307 and a portion of physical memory 305B having an address range 309 may be mapped by the hypervisor to portion 331 of VM memory having an address range 331A. Likewise, a portion of physical memory 305C with an address range 308 may be mapped by the hypervisor to a portion 332 of the VM memory having an address range of 332A. In other words, the hypervisor is able to create and maintain a page table of the mappings between the GPA space and the physical memory space.

The host OS 320 may include a VM worker process instance 340 that is instantiated for running or configuring the VM 310. As illustrated, the VM worker process 340 may include a virtual device (Vdev) 345 and a virtual device (Vdev) 346. It will be noted that additional virtual devices may be included as illustrated by the ellipses 347. In embodiments, the virtual devices may be configured to emulate various devices associated with the VM 310. In embodiments, the VM worker process 340 may include additional components as also represented by the ellipses 347. The additional components may include one or more of a state machine, a virtual motherboard, an IC proxy, or a RDP encoder. In operation, the VM worker process 340 may direct the hypervisor to create the mapping between the VM memory 330 and the physical memory 305 previously described.

In embodiments, the host OS 320 may include a driver 350. In one embodiment, the driver 350 may be a virtual PCI driver that allows for the control of one or more devices that are directly assigned or attached to the VM 310 such as a Graphical Processing Unit (GPU) 370 and/or a Field Programmable Gate Array (FPGA) 380. The directly attached devices will be explained in more detail to follow. As illustrated by the ellipses 351, additional drivers may also be included in the host OS as circumstances warrant. In embodiments, the driver 350 may be able to, independent of the hypervisor, map a portion 333 of VM memory 330 to a portion 305D of physical memory 305 for the use of the attached devices. In such embodiments, the driver 350 may maintain any page tables and the like as needed.

As mentioned, the VM 310 may have various devices that are directly assigned or attached to the VM. For example, one directly assigned or attached device may be the GPU 370. In some embodiments, the GPU 370 may include an input-output memory management unit (IOMMU) 371 or be communicatively coupled to an external IOMMU. Although not illustrated, in other embodiments the IOMMU 371 may be part of the physical processor 306. The IOMMU 371 may have access to a corresponding address space 372 of the GPU 370. In operation, the IOMMU 371 may interface with an attach module 316 of the hypervisor partition 315. The attach module 316 represents the various functionality of the hypervisor that allows the GPU 370 to directly attach to the VM 310. The IOMMU 371 is then able to directly access the GPA space of the VM memory 330 so that a mapping between the GPA space and the device address space may be made, which allows the GPU 370 to directly access the physical memory 305 via the VM memory 305. The GPU 370 may thus have access to the memory pages mapped to the VM memory 305.

In addition, the attach module 316 may allow the GPU 370 to directly access the virtual processors 320 and 325 for needed processing resources. Said another way, the GPU 370 views at least one of the virtual processors 320 and 325 as its assigned processor.

In like manner, another directly assigned or attached device may be the FPGA 380. As illustrated, the FPGA 380 may interface with the attach module 316. As illustrated, in some embodiments, the FPGA 380 may include or otherwise have access to an IOMMU 381. Although not illustrated, in other embodiments the IOMMU 381 may be part of the physical processor 306. The IOMMU 381 may perform a mapping between an address space 382 of the FPGA 380 and the GPA space of the VM memory 330 in the manner previously described for the IOMMU 371. In addition, the FPGA 380 may directly access the virtual processors 320 and 325 for needed processing resources.

The ellipses 383 represent that any number of additional devices may be directly assigned or attached to the VM 310. Examples of the additional devices 383 include, but are not limited to, Universal Serial Bus (USB) including USB3 controllers, storage controllers, Peripheral Component Interconnect Express (PCIe) devices, and Non-Volatile Memory Express (NVMe) storage devices. The additional devices 383 may also include various network cards and the like that expose registers at locations in the computer's physical memory space that may be mapped to the GPA space of the VM memory 330. Accordingly, the embodiments disclosed herein are not limited by the number or type of devices that are directly assigned or attached to the VM 310. It will be noted that for ease of explanation, the embodiments disclosed herein are described having the GPU 370 or the FPGA 380 directly attached to the VM 310. Accordingly, any discussion relating to the operation and the like of the GPU 370 and the FPGA 380 will also apply to any of the other directly assigned devices 383.

The host OS 320 may also include a management module 360. It will be noted that the management module 360 is used for ease of explanation and may represent kernel mode processes such as a Virtualization Infrastructure Driver (VID) and user mode processes such as Virtual Machine Management Service (VMMS). Accordingly, the embodiments disclosed herein are not limited by the actual type of the management module 360.

In operation, the management module 360 may include storage resources that are backed by portions the physical memory 305, such as the portion 305E. In embodiments, the storage resources may be a device extension or the like of the management module 360. In embodiments, the management module may include a partition for each VM of the host 300. However, the memory resources (i.e., the device extension) may remain even if the partitions are removed as long as the memory management module remains loaded in the host 300.

In some embodiments, however, it may be possible to save the storage resources in a portion of the physical memory that has been designated to be persisted even during a host OS 320 shut down. In such embodiments, the management module 360 may be able to be unloaded while still persisting any information saved in the storage resources.

As shown in FIG. 3A, in embodiments the VM worker process 340 may direct the management module 360 to store various information in the memory resources of the management module 360 for the partition corresponding to the VM 310. For example, the VM worker process 340 may direct the management module 360 to store a data block 361 that corresponds to the array of memory pages mapped to the portion 331 of VM memory 330 and to store the corresponding GPA address range 331A as shown at 362. Likewise, the VM worker process 340 may direct the management module 360 to store a data block 363 that corresponds to the array of memory pages mapped to the portion 332 of VM memory 330 and to store the corresponding GPA address range 332A as shown at 364.

The VM worker process 340 may also direct the management module 360 to generate a state file 365 that records the current state of the VM worker process 340. The current state of the various virtual devices 345 and 346 may also be recorded in the state file 365. This file may be used to persist the state of the VM worker process and the virtual devices as will be explained in more detail to follow.

In embodiments, the driver 350 may also direct the management module 360 to record information. For example, the driver 350 may direct the management module 360 to record a data block 366 that corresponds to the array of memory pages mapped to the portion 333 of VM memory 330. The corresponding GPA range may also be recorded. It will be noted that any of the additional drivers 351 may also direct the management module 360 to record information as circumstances warrant. Accordingly, the embodiments disclosed herein contemplate both the VM worker process 340 and various drivers directing the management module 360 to record information as needed.

In embodiments, it may be desirable to service one or more of the components of the VM 310 and/or the host OS 320. The servicing may allow for software updates and the like to happen to the relevant components. In the embodiments disclosed herein, the servicing operation may occur without the need to reboot the host OS 320. In addition, some of the components will not have their underlying data structures removed from the computing system physical hardware (i.e., the physical memory 305 and the physical processor 306) during the servicing operation. Thus, these components will typically not be subject to any update during the servicing operation.

In embodiments, the VM worker process 340 may initiate the VM servicing operation by directing the management module 320 to store the various information in its storage resources (i.e., device extension) in the manner previously described. For example, the management module 320 may save the data blocks 361 and 363 and the corresponding GPA ranges 362 and 364. In addition, the driver 350 may direct the management module 320 to store the data block 366 and corresponding GPA range.

In response to storing the information, the management module 320 may also generate a store 390 for storing persistent identity pointers for components of the VM that are not to have the servicing operation performed on them, but that are to have their underlying data structures remain loaded on the computing system physical hardware. For example, an identity pointer 391 for the hypervisor partition 315 including the virtual processors may be stored in the store 390. In addition, identity pointers 392-396 for the memory block 361, the GPA range 362, the memory block 363, the GPA range 364, and the memory block 366 respectively may be stored in the store 390. The store 390 may then be written into a dedicated portion 305F of the physical memory 305. It will be noted that the identity pointers 391-396 may be considered artifacts that point to the underlying data structures in the computing system physical hardware (i.e., the physical memory 305 and the physical processor 306) for the components corresponding to the identity pointers.

It will be noted that, in at least some implementations, only the data blocks in the management module 360 are persisted. In these implementations, there is no need to access the physical memory 305 to determine the addresses of the data blocks to persist. This may result in a time savings if there is a large number of data blocks to persist or if the data blocks are non-contiguous with each other. In other words, there is no need to walk the memory stack to determine the data blocks to persist.

The state of the VM worker process and virtual devices may also be stored in the state file 365. This state may then be stored in the memory resources of the management module 360 or in the portion 305E of the physical memory 305.

The operation of the VM 310 may then be suspended so that the servicing operation may occur. FIG. 3B represents the VM 310 during the servicing operation. For ease of illustration, some of the elements shown in FIG. 3A are not included in FIG. 3B.

As shown in FIG. 3B, VM worker process 340 and the virtual devices 345 and 346 have been shut down and thus are not present in the figure. In other words, the VM worker process 340 and the virtual devices 345 and 346 have been removed so that any of their underlying data structures have been removed from the computing system physical hardware. As mentioned previously, however, the state of VM worker process 340 and the virtual devices 345 and 346 prior to being shut down was saved in the state file 360 and may be used to restore these components as will be discussed in more detail to follow.

In FIG. 3B, the hypervisor partition 315 and its components including the virtual processors 320 and 325 and the virtual memory 330 and its associated mappings with the physical memory 305 (i.e., 331 and 332) are shown as being dotted. The mapping 333 of the driver 350 is also shown as being dotted. The dots represent that although the operation of the VM 310 has been suspended, the underlying data structures for these components have not been removed from the computing system physical hardware. In other words, even while the operation of the VM 310 has been suspended and the servicing operation is being performed, the hypervisor partition 315 and the GPA mapping remain loaded or programed in the computing system physical hardware. It will be noted, however, that the operation of the components of the hypervisor partition is suspended while the operation of the VM 310 is suspended.

It will also be noted that the host OS 320 is not shut down during the servicing operation, but also remains loaded along with the management module 360, although the specific partition in the memory management module for the VM 310 has been removed. Thus, those components that are not shut down are typically not able to be serviced by the servicing operation as this typically requires that a component be shut down so that any changes to the components during the servicing operation may be implemented.

FIG. 3B also shows that the devices that are directly attached to the VM 310 including the GPU 370 and the FPGA 380 remain attached or are kept active while the operation of the VM 310 has been suspended. That is, from the perspective of the directly attached devices that are kept active, the VM 310 is still in active operation and the devices and the VM 310 are able to normally function in relationship with each other. Thus, the attach module 316 allows the mapping between the GPA space of the VM memory 330 and the IOMMU previously described to remain intact. Since the GPA mapping has not been removed as previously described, the mapping between the device and the VM 310 is able to be maintained.

The devices that are directly attached to the VM 310 including the GPU 370 and the FPGA 380 also retain access to processing resources of the virtual processors 320 and 325. As may be appreciated, since the devices that are directly attached to the VM 310 including the GPU 370 and the FPGA 380 may continue to operate while the operation of the VM 310 is suspended, there may be instances where the directly attached device initiates an interrupt to be handled by one of the virtual processors. For example, the GPU 370 may initiate an interrupt 318 and the FPGA 380 may initiate an interrupt 319. To handle such instances, the attach module or some other component of the VM 310 may include a queue file 317 that is able to queue the interrupts while the virtual processors are suspended. For example, in embodiments where the directly attached device uses Message Signal Interrupts (MSI), the device has at most 32 interrupts and an address that the device writes to indicate a pending interrupt. Where that address is mapped to the VM, the directly attached device is allowed to write to that address, even when the operation of the VM is suspended. The same is true for MSI-X, except that MSI-X has up to 2048 interrupts.

As will be explained in more detail, once the operation of the virtual processors is restored, the virtual processors are able to handle the interrupts in the queue file 317. Thus, from the perspective of the directly attached devices this is only seen as a small delay in processing time.

FIG. 3C shows the process of restoring the VM 310 to operation. As shown, FIG. 3C includes the host OS 320 and the store 390. After the servicing operation of the VM 310 is completed, which may result in one or more components of the VM or host OS being updated or the like, the VM worker process 340 and the virtual devices 245 and 246 may be restored by the host computing system. As previously described, the state of the VM worker process 340 and the virtual devices 245 and 246 was saved before the operation of the VM 310 was suspended. This state may then be used to reload or program the underlying data structures in the computing system hardware to thereby restore the VM worker process 340 and the virtual devices 245 and 246.

Once the VM worker process 340 is restored, the VM worker process may direct the management module 360 to rebuild the partition for the VM 310 and to build a data object for memory blocks and corresponding GPA ranges and may also request that a hypervisor partition be generated. In such case, the management module 360 as shown at 302 may access the identity pointers stored in the store 390. The identity pointers may then allow the management module 360 to access the underlying data structures for the various components stored in the store 390. The management module 360 may then populate the data objects 361-364 and 366 with the recovered underlying data structures as shown at 303. This has the effect of reconnecting the hypervisor partition 315, virtual processors 320 and 325, and the mapping of the virtual memory 330 to the restored VM worker process 340. That is, the VM worker process 340 is now able to use these components without the need for the system to actually rebuild these components in the computing system physical hardware. Said another way, since the hypervisor partition 315, virtual processors 320 and 325, and the mapping of the virtual memory 330 to the physical memory 305 was not removed during the servicing operation, the management module 360 only needs to reconnect the VM worker process 340 to these components.

The reconnecting of the VM worker process to the hypervisor partition 315, virtual processors 320 and 325, and the mapping of the virtual memory 330 to the physical memory 305 may return the VM to the state shown in FIG. 3A prior to the generation of the store 390. That is, the VM 310 may resume its normal operation.

Upon the resumption of the operation of the VM 310, any interrupts such as interrupts 318 and 319 stored in the queue file 317 may be handled by the virtual processors 320 and 325. The directly attached devices such as the GPU 370 and the FPGA 380 may then continue to normally communicate with and operate in relation to the resumed VM 310.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
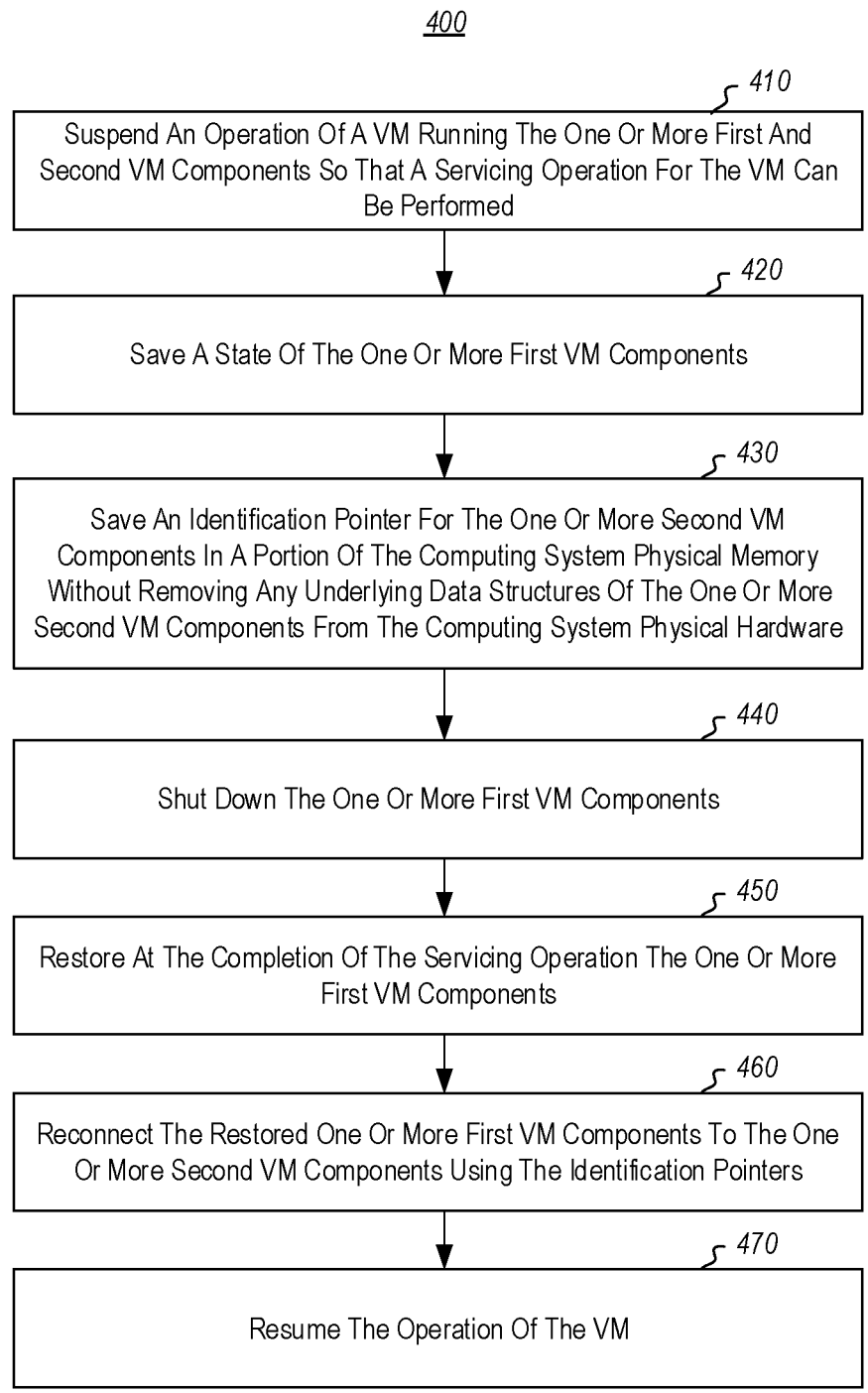
FIG. 4 illustrates a flowchart of an example method for performing a servicing operation on a VM.

FIG. 4 illustrates a flow chart of an example computerized method 400 for servicing components of a VM while second components remain loaded in the computing system physical hardware during the servicing operation. The method 400 will be described with respect to one or more of FIGS. 2-3C discussed previously.

The method 400 includes suspending an operation of a VM running one or more first and second VM components so that a servicing operation for the VM may be performed (410). In some embodiment the VM may have one or more devices that are directly attached to it. For example, as previously described the VM 310 may run or have associated with it the VM worker process 340 and the virtual devices 345 and 346, which may be examples of a first VM component. In addition, the VM 310 may run or have associated with it the hypervisor partition 315, virtual processors 320 and 325, and the virtual memory 330 that has a GPA space that is mapped to the physical memory 305. These may be considered as examples of a second VM component.

As previously described in some embodiments the VM 310 may have one or more devices that are directly attached to it. For example, the GPU 370 and the FPGA 380 may be directly attached to the VM 310.

The method 400 includes saving a state of the one or more first VM components (420). For example, as previously described the state of the VM worker process 340 and the virtual devices 345 and 346 may be stored in the state file 365.

The method 400 includes saving an identification pointer for the one or more second VM components in a portion of the computing system physical memory without removing any underlying data structures of the one or more second VM components from the computing system physical hardware (430). For example, as previously described the identification pointers 391-396 for the hypervisor partition, the memory blocks 361 and 363, and GPA ranges 362 and 364, as well as the memory block 366 may be stored in the store 390, which may correspond to the portion 305F of the physical memory 305.

As previously described, the one or more directly attached devices remain attached to the VM and remain configured to communicate with the VM while the VM is suspended and while the servicing operation is performed since the underlying data structures of the one or more second VM components are not removed. For example, the GPU 370 and the FPGA 380 remain directly attached to and remain configured to communicate with the VM 310 while the operation of the VM 310 is suspended. This happens because the underlying data structures of the hypervisor partition 315, virtual processors 320 and 325, and the virtual memory 330 that has a GPA space that is mapped to the physical memory 305 remain in the physical hardware of the computing system while the VM is suspended.

The method 400 includes shutting down the one or more first VM components by removing any underlying data structures for the one or more first VM components from the computing system physical hardware (440). As previously described, the VM work process 240 and the virtual devices 245 and 246 are shut down by having their underlying data structures removed from the physical hardware of the computing system.

The method 400 includes restoring at the completion of the servicing operation the one or more first VM components (450). For example, as previously described the underlying data structures in the computing system physical hardware of VM work process 240 and the virtual devices 245 and 246 are rebuilt using the saved state from the state file 265.

The method 400 may include reconnecting the restored one or more first VM components to the one or more second VM components using the identification pointers (460). For example, as previously described the identity pointers 391-396 may be used to access the underlying data structures of the hypervisor partition 315, virtual processors 320 and 325, and the virtual memory 330 that has a GPA space that is mapped to the physical memory 305. These components may then be reconnected to the VM work process 240 and the virtual devices 245 and 246 in the manner previously described.

The method 400 includes resuming the operation of the VM (470). For example, the operation of the VM 310 may be resumed in the manner previously described.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system running a host operating system and a virtual machine (VM), the host operating system executing one or more first virtual machine (VM) components, and the VM executing one or more second VM components that are to remain loaded in computing system physical memory during a servicing operation of the computing system, the one or more first VM components configured to manage the one or more second VM components via one or more identification pointers, a method for performing the servicing operation of the VM, the method comprising:
   suspending an operation of the VM running the one or more second VM components, the VM having one or more devices that are directly attached to it;
   saving a state of the one or more first VM components of the host operating system;
   saving the one or more identification pointers for the one or more second VM components in a portion of the computing system physical memory without removing any underlying data structures of the one or more second VM components from the computing system physical memory, wherein the one or more directly attached devices remain configured as attached to the VM and remain configured to communicate with the VM while the VM is suspended and while the servicing operation is performed since the underlying data structures of the one or more second VM components are not removed;
   shutting down the one or more first VM components by removing any underlying data structures for the one or more first VM components from the computing system physical memory;
   restoring at the completion of the servicing operation the one or more first VM components;
   reconnecting the restored one or more first VM components to the one or more second VM components using the identification pointers; and
   resuming the operation of the VM.

2. The method of claim 1, wherein the one or more first VM components include one of a virtual device and a virtual machine worker process.

3. The method of claim 1, wherein the one or more second VM components include one or more of a hypervisor partition and corresponding virtual processor, a page mapping between the physical computing system memory and a virtual memory of the VM, or a virtual device driver configured to interface with the directly attached device.

4. The method of claim 1, wherein the one or more second VM components includes a virtual processor, the computing system being further configured to perform the following:
   queueing any interrupts generated by the one or more directly attached devices while the VM is suspended; and
   having the virtual processor handle the interrupts once the operation of the VM is resumed.

5. The method of claim 1, wherein the one or more second VM components includes a page mapping between the physical computing system memory and a virtual memory of the VM, wherein the one or more directly attached devices use the mapping while in operation while the VM is suspended.

6. The method of claim 1, wherein the one or more directly attached devices include one or more of a Graphical Processing Unit (GPU), a Field Programmable Gate Array (FPGA), USB3 controllers, storage controllers, NVMe storage devices, PCIe device, or a network card.

7. A computing system running a host operating system and a virtual machine (VM), the host operating system executing one or more first virtual machine (VM) components, and the VM executing one or more second VM components that are to remain loaded in computing system physical memory during a servicing operation for the computing system, the one or more first VM components configured to manage the one or more second VM components via one or more identification pointers, the computing system comprising:
   at least one processor; and
   a computer readable hardware storage device having stored thereon computer-executable instructions which, when executed by the at least one processor, cause the computing system to perform the following:
   suspend an operation of the VM running the one or more second VM components, the VM having one or more devices that are directly attached to it;
   save a state of the one or more first VM components of the host operating system;
   save the one or more identification pointers for the one or more second VM components in a portion of the computing system physical memory without removing any underlying data structures of the one or more second VM components from the computing system physical memory, wherein the one or more directly attached devices remain configured as attached to the VM and remain configured to communicate with the VM while the VM is suspended and while the servicing operation is performed since the underlying data structures of the one or more second VM components are not removed;
   shut down the one or more first VM components by removing any underlying data structures for the one or more first VM components from the computing system physical memory;
   restore at the completion of the servicing operation the one or more first VM components;
   reconnect the restored one or more first VM components to the one or more second VM components using the identification pointers; and
   resume the operation of the VM.

8. The computing system of claim 7, wherein the one or more first VM components include one of a virtual device and a virtual machine worker process.

9. The computing system according to claim 7, wherein the one or more second VM components include one or more of a hypervisor partition and corresponding virtual processor, a page mapping between the physical computing system memory and virtual memory of the VM, or a virtual device driver configured to interface with the directly attached device.

10. The computing system of claim 7, wherein the one or more second VM components includes a virtual processor, the computing system being further configured to perform the following:
    queue any interrupts generated by the one or more directly attached devices while the VM is suspended; and
    have the virtual processor handle the interrupts once the operation of the VM is resumed.

11. The computing system of claim 7, wherein the one or more second VM components includes a page mapping between the physical computing system memory and a virtual memory of the VM, wherein the one or more directly attached devices use the mapping while in operation while the VM is suspended.

12. The computing system of claim 7, wherein the one or more directly attached devices include one or more of a Graphical Processing Unit (GPU), a Field Programmable Gate Array (FPGA), USB3 controllers, storage controllers, NVMe storage devices, PCIe device, or a network card.

13. The computing system of claim 7, wherein the second VM components are not subjected to the servicing operation.

14. A computer program product comprising one or more hardware storage devices having stored thereon computer-executable instructions that are structured such that, when executed by one or more processors of a computing system, the computer-executable instructions cause the computing system to:
    run a host operating system and a virtual machine (VM), the host operating system executing one or more first virtual machine (VM) components, and the VM executing one or more second VM components that are to remain loaded in computing system physical memory during a servicing operation for the computing system, the one or more first VM components configured to manage the one or more second VM components via one or more identification pointers;
    suspend an operation of the VM running the one or more second VM components, the VM having one or more devices that are directly attached to it;
    save a state of the one or more first VM components of the host operating system;
    save an identification pointer for the one or more second VM components in a portion of the computing system physical memory without removing any underlying data structures of the one or more second VM components from the computing system physical memory, wherein the one or more directly attached devices remain configured as attached to the VM and remain configured to communicate with the VM while the VM is suspended and while the servicing operation is performed since the underlying data structures of the one or more second VM components are not removed;
    shut down the one or more first VM components by removing any underlying data structures for the one or more first VM components from the computing system physical memory;
    restore at the completion of the servicing operation the one or more first VM components;
    reconnect the restored one or more first VM components to the one or more second VM components using the identification pointers; and
    resume the operation of the VM.

15. The computer program product of claim 14, wherein the one or more first VM components include one of a virtual device and a virtual machine worker process.

16. The computer program product of claim 14, wherein the one or more second VM components include a hypervisor partition and corresponding virtual processor.

17. The computer program product of claim 14, wherein the one or more second VM components include a page mapping between a physical memory of the computing system and a virtual memory of the VM.

18. The computer program product of claim 14, wherein the one or more second VM components include a listing of blocks of the physical computing memory and their corresponding addresses ranges in the physical computing memory that are used by the first and second VM components.

19. The computer program product of claim 14, wherein the second VM components are not subjected to the servicing operation.

* * * * *